United States Patent [19]
Zielinski et al.

[11] Patent Number: 5,678,348
[45] Date of Patent: Oct. 21, 1997

[54] PORTABLE FISHING ROD ORGANIZER

[76] Inventors: Robert Anthony Zielinski; Jeffrey Alan Wilson, both of P.O. Box 1109, Fort Myers, Fla. 33902

[21] Appl. No.: 540,652

[22] Filed: Oct. 11, 1995

[51] Int. Cl.⁶ ............................. A01K 97/10; A01K 97/08
[52] U.S. Cl. ........................ 43/26; 211/70.8; 224/922; 43/21.2
[58] Field of Search ................. 43/54.1, 26, 21.2; 206/315.11; 211/70, 70.8; 224/922

[56] References Cited

U.S. PATENT DOCUMENTS

| | | | |
|---|---|---|---|
| 2,721,680 | 10/1955 | Steckman | 224/922 |
| 3,113,363 | 12/1963 | Fyvie | 211/70.8 |
| 3,987,574 | 10/1976 | Pennino | 43/26 |
| 4,628,628 | 12/1986 | Burgin | 211/70 |
| 5,040,324 | 8/1991 | Rivera | 224/922 |
| 5,071,048 | 12/1991 | Price | 224/922 |
| 5,137,319 | 8/1992 | Saunder | 211/70.8 |
| 5,450,688 | 9/1995 | Hall | 224/922 |

*Primary Examiner*—Kurt Rowan
*Attorney, Agent, or Firm*—William E. Noonan

[57] ABSTRACT

A fishing rod organizer is disclosed. The organizer includes a pair of circular, axially detached brackets. Each bracket has a like plurality of generally radial slots. A resilient element is disposed in each slot for releasably gripping a fishing rod that extends through the slot. The brackets are axially aligned to align each slot of one of the brackets with a corresponding slot of the other bracket such that a fishing rod extended through a respective aligned pair of slots is held by the brackets. A pair of restraining straps are provided. Each selectively encircles the respective bracket and carries a first hook and loop connector on an inside surface of the restraining strap. Each bracket carries a complementary second hook and loop connector that is disposed circumferentially about the bracket. The first and second hook and loop connectors of a respective restraining strap and bracket are releasably interengaged to fasten the restraining strap circumferentially to the bracket such that a fishing rod extending through a slot of the bracket is restrained therein by the restraining strap. A carrying strap extends between the brackets. One end of the carrying strap is coupled to one of the brackets and the other end of the carrying strap is coupled to the other bracket. The carrying strap is grasped between the ends thereof to carry the brackets and each fishing rod held thereby.

9 Claims, 4 Drawing Sheets

PORTABLE FISHING ROD ORGANIZER

FIELD OF THE INVENTION

This invention relates to a fishing rod organizer and, more particularly, to a portable apparatus for organizing and transporting a plurality of standard fishing rods or poles.

BACKGROUND OF THE INVENTION

A number of fishing rod organizers are presently known. Bergin et al., U.S. Pat. No. 4,628,628, and Sauder, U.S. Pat. No. 5,137,319 employ generally circular brackets, which hold a plurality of fishing poles in a segregated condition so that they may be transported without tangling. Each of these devices also includes an axial cylinder. In Bergin the cylinder interconnects a pair of circumferentially slotted brackets. The Sauder cylinder axially supports a circular bracket above a rectangular base. These known fishing rod holders tend to be bulky, heavy and rather awkward to transport. Moreover, the conventional organizers feature rather poor fastening components for holding the fishing rods. In Sauder, each rod handle fits in a respective, shallow, circular recess located in the base. The handle is apt to fall out of the recess when the holder is tipped horizontally for carrying. The other bracket of Sauder employs foam lined slots to frictionally grip respective rods. Nonetheless, it is still quite easy for the rods to slip out of these slots, particularly if the organizer is jostled. Bergin eliminates the foam gripping elements. Instead, that reference employs an outer groove that extends circumferentially about the circular bracket. A split band is fit into the groove to restrain the rods. This is a rather intricate and unreliable fastening mechanism. Fitting the fishing poles into the bracket and then attaching the split band to the bracket is a time consuming, tedious process.

Another rod carrier disclosed by Price, U.S. Pat. No. 5,071,048 employs a pair of plates with respective holes. Each rod must be inserted through a pair of aligned holes, one at a time. Inserting the rods can be annoying and tedious. The eyelets along the rod can hinder and complicate insertion.

SUMMARY OF INVENTION

It is therefore an object of the present invention to provide an improved portable fishing rod holder, which efficiently organizes a plurality of fishing rods in a neat, untangled manner, and which allows those rods to be transported in that condition to a desired location.

It is a further object of this invention to provide a fishing rod organizer that is extremely durable, yet lighter in weight, simpler in construction and easier to use than previous fishing rod holders.

It is a further object of this invention to provide a fishing rod organizer that securely grips the rods and avoids unintended dislodgment of the rods during transport.

It is a further object of this invention to provide a fishing rod organizer that may be readily adjusted to accommodate various sizes and types of fishing rods.

It is a further object of this invention to provide fishing rod organizer that is convenient for virtually all persons to use.

It is a further object of this invention to provide a portable fishing rod holder with which a plurality of fishing rods can be quickly and easily engaged.

This invention features a fishing rod organizer that includes a pair of circular, axially detached brackets. Each bracket has a like plurality of generally radial slots formed therein. There are means disposed in each slot for releasably gripping a fishing rod that extends through the slot. The brackets are axially aligned to align each slot of one of the brackets with the corresponding slot of the other bracket such that a fishing rod extended through respective aligned pair of slots is held be the brackets. A carrying strap extends between the brackets and means are provided for coupling one end of the carrying strap to one of the brackets and the other end of the carrying strap to the other bracket. The carrying strap is grasped between the ends to carry the brackets and each fishing rod held thereby.

In a preferred embodiment, the means for gripping include a resilient element that is received within and attached to the slot. The resilient element has means defining an expandable notch that snugly receives a fishing rod such that the resilient element grips the rod. The resilient element include an elongate foam piece that is folded within the slot to define the notch. The notch may include a radial slit with an enlarged opening formed at one end and generally V-shaped entry formed at the other end. Adhesive means may be used for securing the foam piece within the slot. Each slot may include an entrance formed in the circumference of the bracket and the bracket may include lip means formed adjacent to each entrance for further holding the foam element within the slot. The lip means may include a pair of generally opposing and circumferentially extending lips that extend into a respective slot to define the entrance of the slot.

A pair of restraining straps are preferably utilized. Each selectively encircles a respective bracket and carries a first hook and loop connector on an inside surface thereof. Each bracket carries a complementary second hook and loop connector that is disposed circumferentially about the bracket. The first and second hook and loop connectors of a respective restraining strap and bracket are releasably interengaged to fasten the restraining strap circumferentially to the bracket such that a fishing rod extending through a slot of the bracket is retrained therein by the restraining strap.

Each bracket may include a plurality of generally radial arms alternately interspersed with the slots. The second hoop and loop connector means may include a plurality of hook and loop elements. Each hook and loop element is attached to a distal end of one of the radial arms. The bracket may include opposing front and back sides that have relatively deep recesses formed therein and a relatively thin central rib formed between the recesses. Means may be provided for adjusting the length of the carrying strap. Such means may include a strap adjustment clip.

BRIEF DESCRIPTION OF THE DRAWINGS

Other objects, features and advantages will occur from the following description of preferred embodiments and the accompanying drawings, in which.

Figure 1:
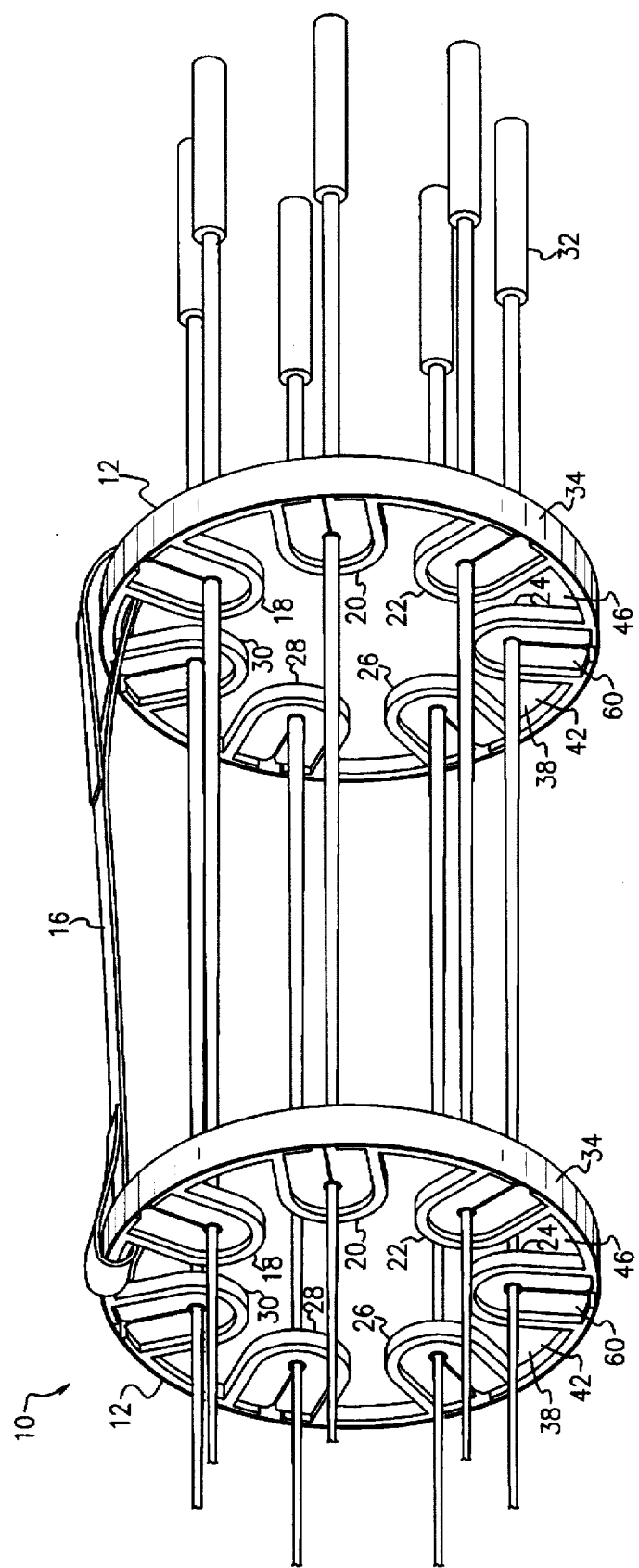
FIG. 1 is a perspective view of a preferred fishing rod organizer holding a plurality of fishing rods in accordance with this invention.

There is shown in FIG. 1 a fishing rod organizer 10 which includes a pair of circular brackets 12 that are interconnected by a carrying strap 16. Unlike circular organizer brackets of the prior art, brackets 12 and 14 are axially detached. The only permanent interconnection between the brackets is an elongate carrying strap 16. Each bracket 12 includes seven inwardly extending radial slots 18, 20, 22, 24, 26, 28 and 30 formed at equal angular intervals about the circumference of bracket 12. Each of these slots carries a foam gripping element in the manner described more fully below. Respective slots 18–30 in each bracket 12 are aligned and a fishing rod 32 is received through each such pair of aligned slots. A restraining strap 34 is circumferentially engaged with each bracket, again as described below, to ensure that each rod 32 is held within its respective slots.

Figure 2:
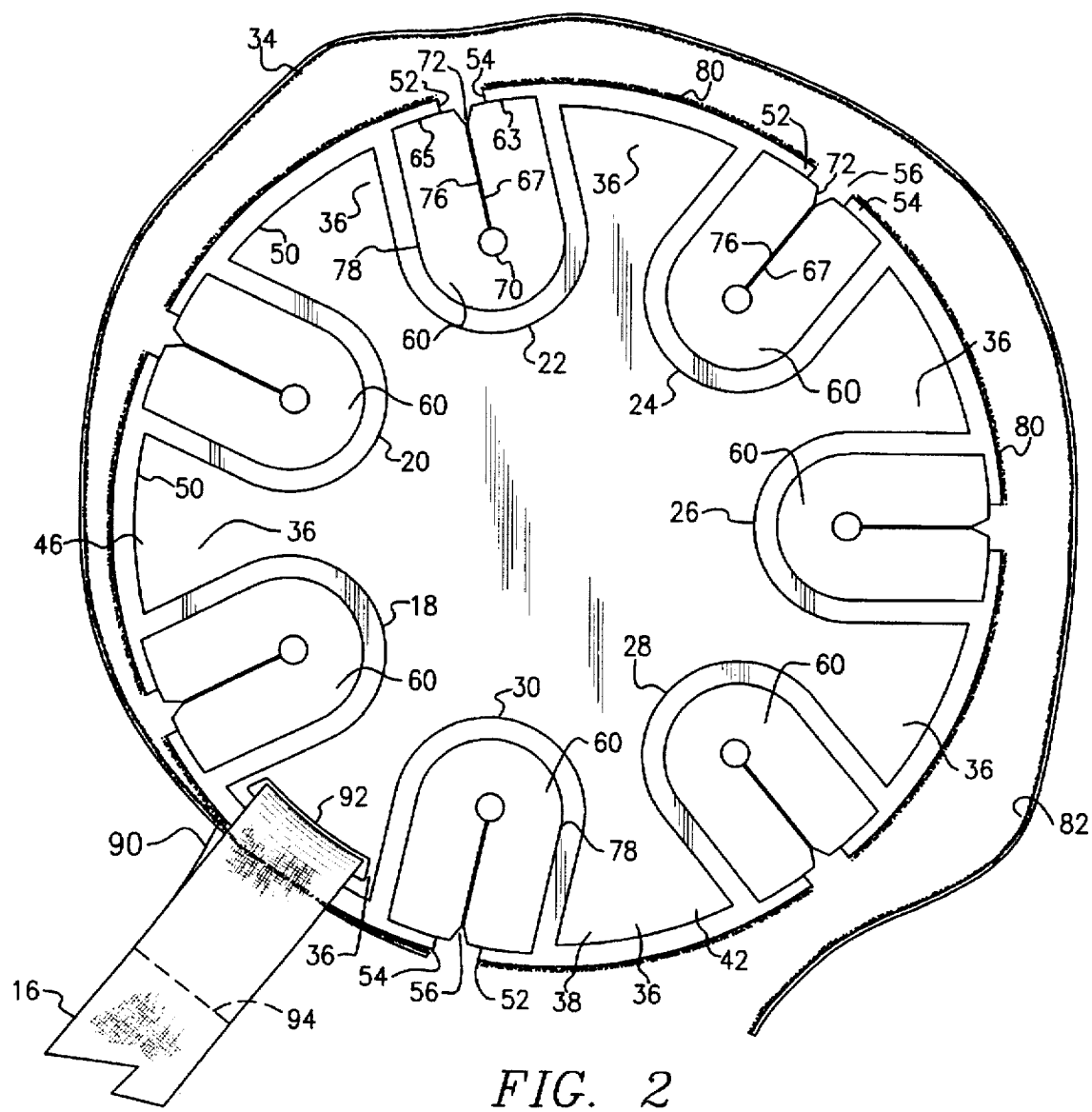
FIG. 2 is a front elevational view of the one of the brackets utilized in the organizer, as well as the gripping elements, carrying strap and circumferential restraining strap associated with that bracket.

The left-hand or forward bracket 12 in FIG. 1 is shown in FIG. 2. A representative bracket 12, without the attached gripping elements and straps, is illustrated alone in FIG. 3. The radial slots 18–30 are alternately interspersed with radial bracket arms 36. Each slot has a generally U-shaped cross sectional configuration. Although seven slots are shown in this embodiment, various other numbers of slots can be used.

Figure 3:
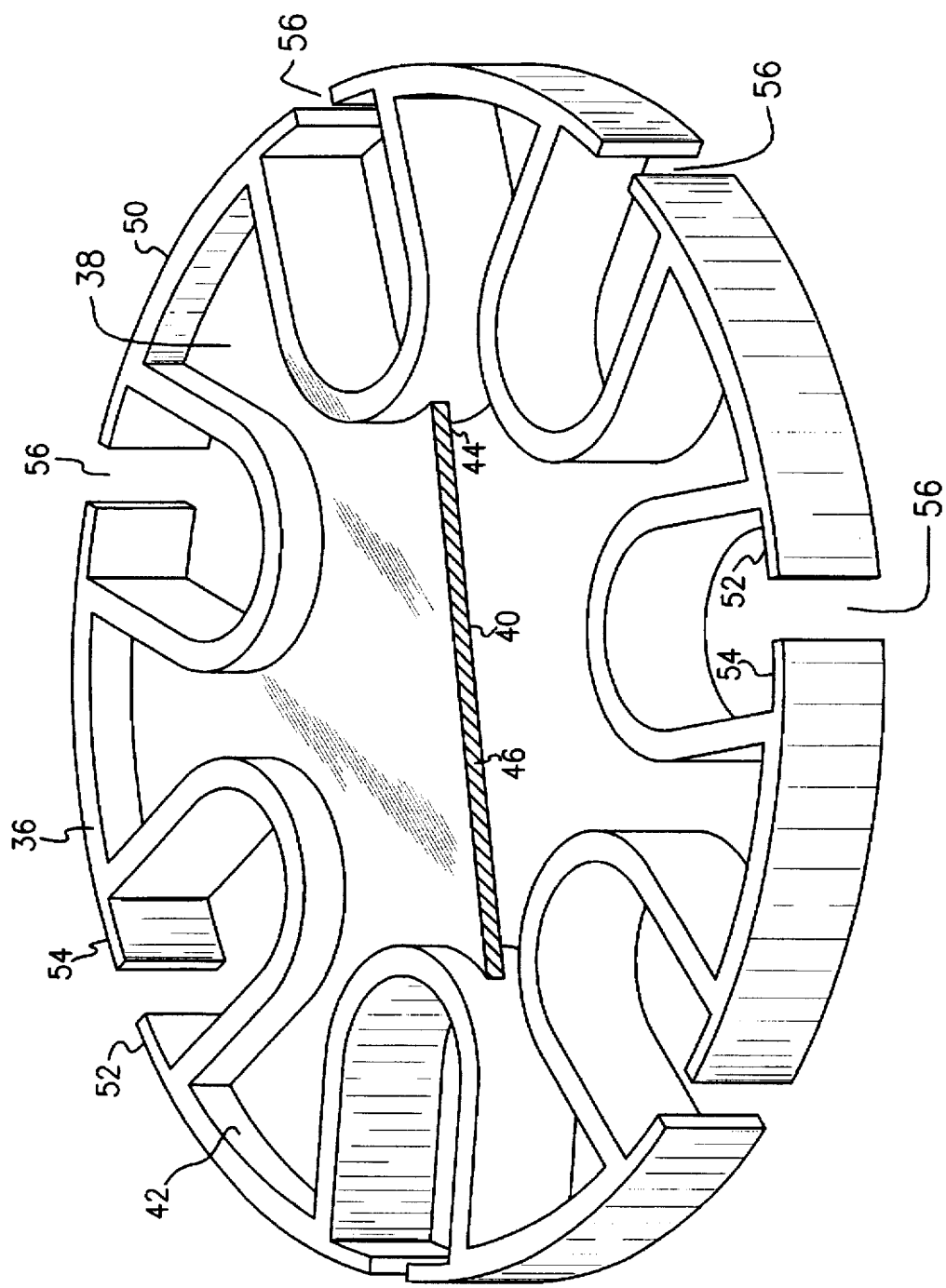
FIG. 3 is a perspective view a molded bracket without the foam inserts or various straps attached thereto.

Each bracket includes virtually identical front and back sides. The front side 38 is illustrated in FIGS. 1–3. The opposite back side 40 is obscured in FIGS. 1 and 2 and is referred to only in FIG. 3. Each bracket 12 preferably comprises a molded plastic unit having relatively deep recesses 42 and 44 formed in front and back sides 38 and 40, respectively. A relatively thin central web 46 is formed between the recesses. The depth of recess 42 is equal to that of recess 44. The thickness of web 46 is less than the depth of either of recesses 42 and 44. Each slot has a front to back thickness that is equal to the overall width of the bracket. Typically, the entire bracket 12, including slots 18–30, arms 36 and web 46, is formed unitarily from a single piece of molded plastic. Anodized aluminum, fiberglass and various lightweight wood or metal materials may also be employed. Known molding techniques and other manufacturing processes are typically used to construct the brackets.

As best shown in FIGS. 2 and 3, the distal surface 50 of each radial arm 36 has an arcuate shape that defines a portion of the circumference of bracket 12. Adjacent to each of the slots 18–30 there are formed a pair of opposing lips 52 and 54 that extend circumferentially from respective distal surfaces 50 of adjacent radial arms 36. A space 56 between lips 52 and 54 defines the entrance to each slot.

Figure 4:
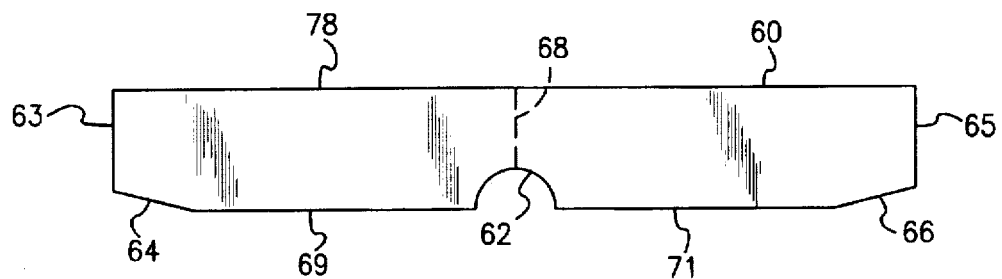
FIG. 4 is an elevational view of a representative foam gripping element before the element is introduced into a slot in the organizer bracket.
Figure 5:
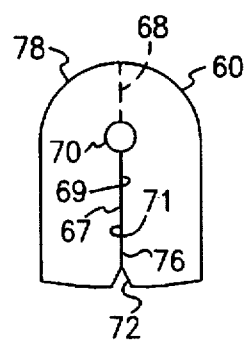
FIG. 5 is an elevational top view of the foam gripping element in a folded condition.
Figure 6:
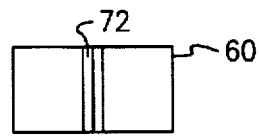
FIG. 6 is an elevational front of the folded gripping element.

As best shown in FIG. 2, each of the slots 18–30 accommodates a respective foam gripping element 60. Each gripping element typically comprises a standard closed cell foam material. Various other types of resilient substances may also be employed. Initially, each foam element 60 defines an elongate strip, as shown in FIG. 4. Initially, before foam element 60 is inserted into its respective slot. A semi-circular cutout 62 is formed in one side of element 60 approximately midway between the ends. A pair of angled edges 64 and 66 are likewise formed proximate the ends of the foam strip. Strip 60 is folded along median line 68, in the manner illustrated in FIGS. 5 and 6, such that surfaces 69 and 71 (FIG. 4) of the lower edge of element 60 interengage. As best illustrated in FIG. 5, a notch 67 is formed in the folded foam element. This notch includes an enlarged inner opening 70, defined by the enclosed cut out 62 (shown in FIG. 4). A V-shaped entry 72 (see also FIG. 6) is formed by angled edges 64 and 66. A narrow, but expandable slit 74, located between the junction of surfaces 69 and 71, interconnects opening 70 and entry 72. Slit 74 expands so that a fishing rod can be inserted into and removed from notch 67 through the slit.

Referring again to FIG. 2, each folded element 60 is installed in a respective one of the slots 18–30 such that its respective slit 72 is generally radially disposed. An appropriate adhesive is applied to the surface 78 of element 60 (see also FIGS. 4 and 5) that interengages the slot. This secures the folded gripping element 60 to its respective slot. Circumferential lips 52 and 54 engage respective ends 65 and 63 of element 60. Adhesive may also be employed between the ends of the foam strip and the circumferential lips. This further assists in holding the folded foam strip within its respective slot. Unlike the prior art, the foam elements are thereby prevented from being inadvertently pulled out of the bracket 12 when rods are removed from the bracket.

After the foam elements 60 are secured to their respective slots 18–30, the bracket is ready to accept and grip one or more fishing rods. This is accomplished by first aligning the brackets 12 such that respective slots 18–30 in each bracket are aligned, as shown in FIG. 1. Each fishing pole or rod 32 is then engaged with a respective slot 30 in each bracket 12 in the following manner. The rod is introduced through slot entrance 56, FIG. 2, and into the notch 67 of the respective gripping element 60 carried within slot 30. More particularly, rod 32 is introduced transversely into V-shaped entry 72 and is slidably urged through slit 67 into opening 70. The slit expands as the rod is urged through it and fully closes when the rod reaches opening 70. Each rod 32 is engaged with a pair of aligned slots in this manner. As a result, the rod extends through a pair of aligned openings 70 and is held securely within an aligned pair of slots, in the manner shown in FIG. 1, by a respective pair of gripping elements 60. Closed slits 76, FIGS. 2 and 5, restrain the rod within openings 70, at least until sufficient force is exerted to remove the rod from the openings through respective slits 76 and slot entrances 56.

Notch 67 preferably employs an enlarged opening 70 because such an opening helps to prevent element 60 from ripping at the inner end of slip 76 when a rod is inserted. In alternative embodiments, wherein a tear resistant foam is used, opening 70 may be eliminated. In such cases the gripping force of foam element 60 adjacent to slit 76 should be made sufficiently strong to hold rod 32 in place within the gripping element.

As best illustrated in FIG. 2, complementary hook and loop connectors are carried by each bracket 12 and its restraining strap 34. Specifically, a loop element 80 is carried by each radial arm 36 of bracket 12. Each loop element 80 typically comprises a strip of standard loop material that is secured, adhesively or otherwise, to the distal, circumferential surface 50 of arm 36. Restraining strap 34 encircles each bracket 12 and carries on its inner surface a complementary hook and loop fastener. In this embodiment, that fastener comprises conventional hook material 82 that is releasably engageable with of the loop components 80. Strap 34 is releasably secured to the circumference of bracket 12 by wrapping the straps circumferentially about the bracket such that complementary hook and loop components 80 and 82 interengage. When the straps 34 are engaged in this manner with brackets 12, as shown in FIG. 1, they assist in restraining the fishing rods within their respective pairs of aligned slots. The straps ensure that the rods will not unintentionally fall from or be knocked out of brackets 12. In alternative embodiments, the hook and loop material may be interchanged such that the loop material is carried by the strap 34 and the hook material is carried by the radial arms 36.

Adjustable strap 16 is permanently connected to brackets 12. As illustrated in FIG. 2, strap 16 includes a looped first end 90 that extends through an opening 92 formed in the web 46 of bracket 12. This loop is formed by stitching or otherwise fixing the distal end of the strap to a point 94 along strap 16.

Figure 7:
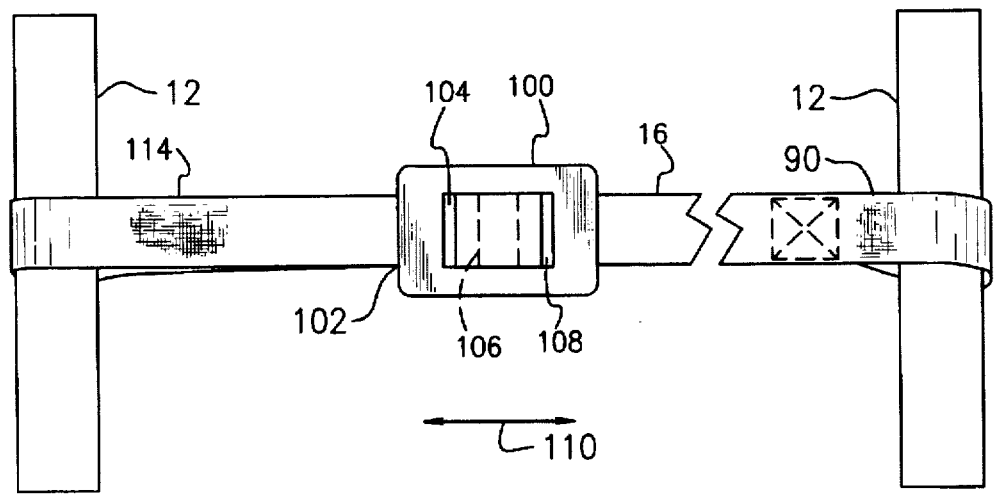
FIG. 7 is an elevational side view of the adjustable carrying strap and strap adjustment clip.

The opposite end of strap 16 is adjustably interengaged with the other bracket 12. As shown in FIG. 7, strap 16 includes a standard adjustable clip 100 that is attached to end 102 of the strap. Strap 16 extends from end 102 and loops through an opening in the web of the left-hand bracket 12 (which is similar to opening 92 in FIG. 2). The strap is slidably received through clip 100. Specifically the strap extends beneath the left-hand end of clip 100, up through clip slot 104, over clip member 106 (shown in phantom), down through clip slot 108, and again beneath the right-hand end of clip 100. From there the strap extends to and terminates in loop 90. To adjust the length of the strap 16, the clip is slid along the strap as indicated by doubleheaded arrow 110. As the clip moves, the strap slides through slots 104 and 108 and over member 106. More particularly, when clip 100 is moved to the right, loop 114 is enlarged. This shortens the strap and, consequently, the distance between brackets 12. Conversely, sliding clip 100 to the left in FIG. 7, causes loop 114 to shrink, which lengthens strap 12. In this manner the length of the carrying strap may be adjusted so that apparatus 10 effectively accommodates different sizes and types of fishing rods.

In operation, the brackets 12 and their respective slots are aligned in the manner shown in FIG. 1. Strap 16 is adjusted to its desired length and individual rods 32 are quickly and easily interengaged with and gripped by respective aligned pairs of slots and gripping elements. Restraining straps 34 are circumferentially engaged with each of the brackets to restrict removal of the rods from the slots. Strap 16 is then grasped by the user and the entire apparatus 10 is lifted and transported, as required. During transport, rods 32 are kept separated so that they do not become entangled. Subsequently, the rods are easy to deploy when the user reaches a fishing site or at other times when one or more of the rods are required. At such times, the restraining straps 34 are removed by disengaging hook components 82 from loop components 80. The rod or rods are then removed from the brackets simply by urging each rod out of its respective pair of aligned slots. Slits 76 of foam elements 60 readily expand so that only a modest amount of force is required to disengage the rod from the brackets. When use of the rod is completed, it is replaced within its aligned pair of slots in the manner previously described. Further storage and transport are thereby facilitated considerably.

In certain embodiments the restraining strap and accompanying hook and loop connectors may be eliminated. This is appropriate where the gripping element is constructed to provide a particularly secure grip (for example, when a dense or highly resilient foam is employed). In embodiments employing less powerful gripping elements (for example, foam with a low density or resilience) the restraining straps should be used.

It is quite important that the organizer of this invention be lightweight and easy to transport. This is accomplished largely through the use of a bracket with relatively deep upper and lower recesses and a relatively thin central web. Such a construction minimizes the amount of material that is required. By employing a lightweight, yet durable construction the apparatus is both convenient to use and exhibits a long useful life.

Although specific features of the invention are shown in some drawings and not others, this is for convenience only, as each feature may be combined with any or all of the other features in accordance with the invention. Other embodiments will occur to those skilled in the art and are within the following claims.

What is claimed is:

1. A fishing rod organizer comprising:

A pair of circular, axially detached brackets, each said bracket having a like plurality of generally radial slots formed therein, each said bracket including opposing front and back sides that have relatively deep recesses formed respectively therein and a relatively thin central web formed between said recesses;

means, disposed in each said slot for releasably gripping a fishing rod that extends through said slot, said means for releasably gripping consisting exclusively of a resilient foam element that is received within and attached to said slot, said resilient foam element having means defining a notch that snugly receives a fishing rod such that said resilient foam element grips the rod, said notch including an expandable slit that receives a fishing rod, said slit being bounded by a pair of resilient foam gripping surfaces that are biased together to snugly grip a rod received by said slit, said notch including an enlarged opening at an inner end of said slit for accommodating a rod received by said slit, said notch further including a V-shaped entry at an outer end of said slit for facilitating introduction of a rod into said slit;

each said slot including an entrance formed in the circumference of said bracket and said bracket including lip means formed adjacent to said entrance for holding said resilient element within said slot, said lip means including a pair of generally opposing and circumferentially extending lips that extend toward one another into a respective said slot, each said lip having a respective distal end, a space being formed between said distal ends of said opposing pair of lips, which said space defines said entrance to said slot, said entrance having a width that is narrower than the width of the remainder of said slot, said opposing pair of lips overlapping and interengaging a radially facing portion of a respective said resilient element to hold said resilient element in said slot;

said brackets being axially aligned to align each said slot of one of said brackets with a corresponding slot of the other bracket such that a fishing rod extended through a respective aligned pair of said slots is held by said brackets;

a carrying strap that extends between said brackets; and means for coupling one end of said carrying strap to one of said brackets and the other end of said strap to the other said bracket, said carrying strap being grasped between said ends thereof to carry said brackets and each fishing rod held thereby.

2. A fishing rod organizer comprising:

A pair of circular, axially detached brackets, each said bracket having a like plurality of generally radial slots formed therein;

means, disposed in each said slot, for releasably gripping a fishing rod that extends through said slot, said means for releasably gripping consisting exclusively of a resilient element that is received within and attached to said slot, said resilient element having means defining a notch that snugly receives a fishing rod such that said resilient element grips the rod, said notch including an expandable slit that receives a fishing rod, said slit being bounded by a pair of resilient gripping surfaces that are biased together to snugly grip the rod received by said slit;

each said slot including an entrance formed in the circumference of said bracket and said bracket including lip means formed adjacent to each said entrance for holding said resilient element within said slot, said lip means including a pair of generally opposing and circumferentially extending lips that extend toward one another into a respective said slot, each said lip having a respective distal end, a space being formed between said distal ends of said opposing pair of lips, which said space defines said entrance to said slot, said entrance having a width that is narrower than the width of the remainder of said slot, said opposing pair of lips overlapping and interengaging a radially facing portion of a respective said resilient element to hold said resilient element in said slot;

said brackets being axially aligned to align each said slot of one of said brackets with a corresponding slot of the other bracket such that a fishing rod extended through a respective aligned pair of said slots is held by said brackets;

a carrying strap that extends between said brackets; and means for coupling one end of said carrying strap to one of said brackets and the other end of said strap to the other said bracket, said carrying strap being grasped between said ends thereof to carry said brackets and each fishing rod held thereby.

3. The apparatus of claim 2 in which said notch includes an enlarged opening at an inner end of said slit for accommodating a rod received by said slit.

4. The apparatus of claim 2 in which said notch includes a V-shaped entry at an outer end of said slit for facilitating introduction of a rod into said slit.

5. The apparatus of claim 2 in which said resilient element includes an elongate foam piece that is folded within said slot to define said notch.

6. The apparatus of claim 5 further including adhesive means for securing said foam piece within said slot.

7. The apparatus of claim 2 in which each said bracket includes a plurality of generally radial arms alternately interspersed with said slots, and further including a pair of retraining straps, each selectively encircling a respective bracket and carrying a first hood and loop connector on an inside surface of said restraining strap, each bracket carrying a complementary second hook and loop connector that is disposed circumferentially about said bracket, said first and second hook and loop connectors of a respective one of said restraining strap and bracket being releasably interengaged to fasten said restraining strap circumferentially to said bracket such that a fishing rod extending through a slot of said bracket is restrained therein by said restraining strap, said second hook and loop connector including a plurality of hook and loop elements, each said hook and loop element being attached to a distal end of one of said radial arms.

8. The apparatus of claim 2 in which each said bracket includes opposing front and back sides that have relatively deep recesses formed respectively therein and a relatively thin central web formed between said recesses.

9. The apparatus of claim 2 further including a pair of restraining straps, each selectively encircling a respective bracket and carrying a first hook and loop connector on an inside surface of said restraining strap, each said bracket carrying a complementary second hook and loop connector that is disposed circumferentially about said bracket, said first and second hook and loop connectors of a respective one of said restraining strap and bracket being releasably interengaged to fasten said restraining strap circumferentially to said bracket such that a fishing rod extending through a slot of said bracket is restrained therein by said restraining strap.

* * * * *